United States Patent
Åbom

[11] 3,981,277
[45] Sept. 21, 1976

[54] SOLID FUEL INJECTION APPARATUSES

[76] Inventor: Jan Viktor Åbom, Poppelgatan 12, 421 74 Vastra Frolunda, Sweden

[22] Filed: Feb. 18, 1975

[21] Appl. No.: 550,640

[30] Foreign Application Priority Data
Mar. 4, 1974 Sweden .............................. 7402810

[52] U.S. Cl. ............................ 123/23; 123/24 R; 123/136
[51] Int. Cl.² ......................................... F02B 45/02
[58] Field of Search....................... 123/23, 24, 136; 60/39.46

[56] References Cited
UNITED STATES PATENTS

| | | |
|---|---|---|
| 1,191,072 | 7/1916 | Fessenden............................ 123/23 |
| 1,837,620 | 12/1931 | Karl..................................... 123/23 |
| 2,836,158 | 5/1958 | Harvey................................. 123/23 |

FOREIGN PATENTS OR APPLICATIONS

| | | | |
|---|---|---|---|
| 899,653 | 7/1945 | France................................. | 123/23 |
| 509,507 | 10/1930 | Germany............................. | 123/23 |
| 146,651 | 4/1931 | Switzerland......................... | 123/23 |
| 269,163 | 5/1928 | United Kingdom.................. | 123/23 |
| 266,381 | 1/1928 | United Kingdom.................. | 123/23 |

*Primary Examiner*—Charles J. Myhre
*Assistant Examiner*—William C. Anderson
*Attorney, Agent, or Firm*—Karl W. Flocks

[57] ABSTRACT

An apparatus for injecting pulverulent fuel into the combustion chamber of internal combustion engines includes a pre-chamber for the fuel powder which is to be supplied to the combustion chamber during an engine cycle. This pre-chamber is adapted, during an engine cycle, to be successively connected to a vacuum source, a fuel supply and the combustion chamber. To this end, the apparatus includes a movable member having the pre-chamber formed therein and being adapted, by co-operation with sealing elements applied under pressure against the movable member, sealingly to engage fixed connections leading to the vacuum source, the fuel supply and the combustion chamber. During the operating cycle of the movable member the pre-chamber successively passes the aforementioned connections so as to be placed in communication with the vacuum source, the fuel supply and the combustion chamber.

10 Claims, 8 Drawing Figures

SOLID FUEL INJECTION APPARATUSES

The invention relates to an apparatus for injecting pulverulent fuel into the combustion chamber of internal combustion engines, including a pre-chamber for the fuel powder which is to be supplied to the combustion chamber during an engine cycle, said pre-chamber being adapted, during an engine cycle, to be successively connected to a vacuum source for producing a vacuum in said pre-chamber, to a fuel supply for feeding fuel powder to the pre-chamber by the action of the vacuum prevailing therein, and to the combustion chamber for injecting the fuel thereinto by the action of a pressure placed on said fuel. In the prior-art apparatuses of this type, the pre-chamber has been stationary and, by co-operating with valves, has been successively connected to the various units. The apparatuses have entailed serious technical problems particularly with regard to the sealing aspect.

This invention eliminates the said problems. To this end, the apparatus according to the invention includes a movable member which is adapted, by its co-operation with sealing elements applied under pressure against it, sealingly to engage fixed connections leading to the vacuum source, the fuel supply and the combustion chamber, the movable member being provided with said pre-chamber which is adapted, during the operating cycle of the movable member, successively to pass said connections so as to be placed in communication with the vacuum source, the fuel supply and the combustion chamber.

A great advantage resides in that the sealing elements, by reason of their co-operation with a movable member, can be formed with large sealing surfaces. This arrangement provides a most satisfactory sealing effect as well as good lubrication and therefore reduced wear.

The lubrication is realized by a pyrolysis of the fuel powder that penetrates between the friction surfaces. The powder is converted into gases and liquids, preferably oils. This conversion, which is due to the generated frictional heat, is directly proportional to the frictional force and the relative speed of the friction surfaces. Most fuels are pyrolysed at insignificant oxygen supply at a temperature of 300°–1000°C. Straw, peat and wood powders in particular produce a good lubrication.

One object of the present invention is to provide an apparatus which, after the connection leading to the combustion chamber, has a connection which leads to the ambient air and serves to lower the pressure in the pre-chamber when it passes said last-mentioned connection. This will assure an optimum of efficiency to the vacuum source inasmuch as it need not operate against a pressure above atmospheric in the pre-chamber.

Another object of the invention is to provide an apparatus in which the vacuum of the vacuum source is infinitely adjustable for infinite regulation of the supply of fuel powder to the pre-chamber and thus to the combustion chamber. This permits the engine output to be rapidly changed.

Embodiments of the invention will be more fully described hereinbelow and with reference to the accompanying drawings in which:

FIG. 1 diagrammatically shows the apparatus in a first embodiment thereof,

Figure 2:
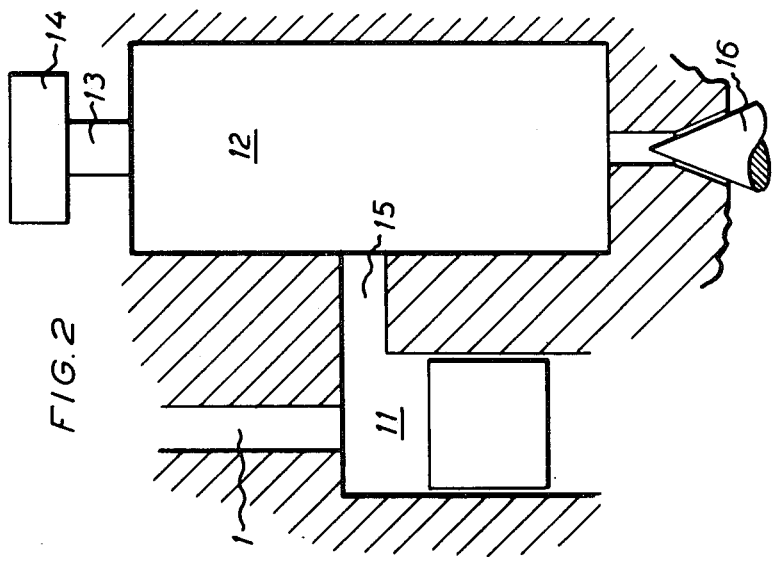
FIG. 2 shows the vacuum source associated with said apparatus.
Figure 1:
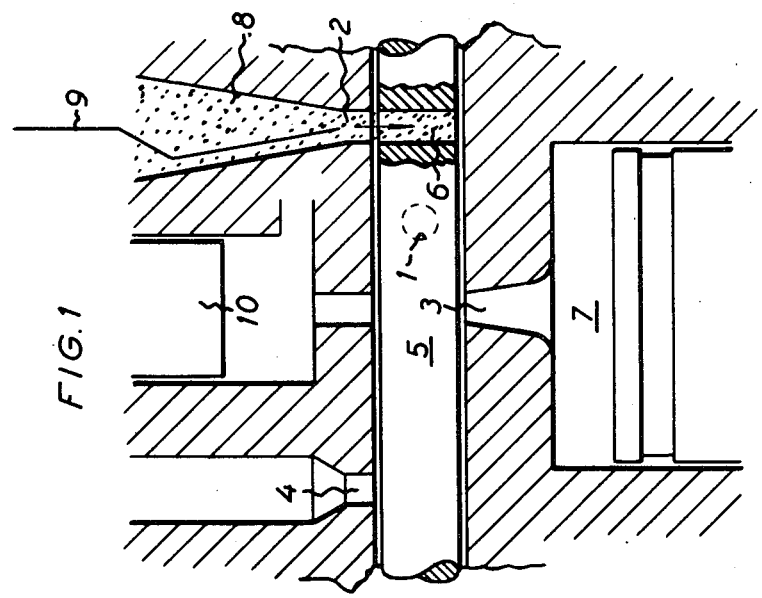

The apparatus is intended for the injection of pulverulent fuels into the combustion chamber of internal combustion engines of different types. It can thus be used for the operation of Otto engines and diesel engines and for feeding Lurgi generators, steam boilers etc.

In order that a solid fuel shall permit being rapidly burnt at the combustion stroke of an internal combustion engine the fuel must be so finely divided that the contact surface between the compressed air and the fuel is so large that the combustion can take place during a period of only about 30% of the piston travel from the upper dead center to the lower dead center. In addition, the fuel powder must be very well distributed in the compression chamber in order that a complete combustion shall take place during the short time the piston (the rotary piston in Wankel type engines) moves during combustion. As fuel, use is advantageously made of powders of wood, peat, coal, coke and straw, with a particle size of 0–0.2 mm.

In the embodiment illustrated in FIGS. 1–6, 1 designates the fixed connection to the vacuum source, 2 the fixed connection to the fuel supply, 3 the fixed connection to the combustion chamber and 4 the fixed connection to the ambient air. Said connections 1–4 open into a space in which a slide 5 is movable and adapted sealingly to engage the connections 1–4. The slide 5 is equipped with a pre-chamber 6 which is adapted during the operating cycle of the slide 5 successively to pass the connection 1 leading to the vacuum source, the connection 2 leading to the fuel supply, the connection 3 leading to the combustion chamber and the connection 4 leading to the ambient air.

In order that the correct amount of fuel shall be supplied through the connection 3 to the combustion chamber 7 in each combustion phase, it must be possible infinitely to vary the fuel amount. This is realized in that the pre-chamber 6 is placed under varying vacuum and then brought in communication with a conical container 8 via the connection 2. The container 8 holds the fuel powder and is provided with an agitator 9 which prevents air bubbles from remaining in the powder. The lower part of the container 8 is coated with a friction-reducing material, such as teflon, so that the fuel easily enters the pre-chamber 6. Having been partially filled with fuel powder, the pre-chamber 6 is moved so as to be brought in communication with the connection 3 leading to the combustion chamber 7 and with a powder accelerating means 10 which throws the fuel into the combustion chamber.

The accelerating means 10 must impart so high a speed to the powder that it is finely divided in the combustion chamber 7. The acceleration of the fuel powder can be effected by means of compressed air, oxygen gas or any combustible gas, such as methane, hydrogen, liquefied petroleum gas and town gas. The fuel powder can also be injected in a purely mechanical manner with the aid of a piston activated by a strong spring.

Figure 3:
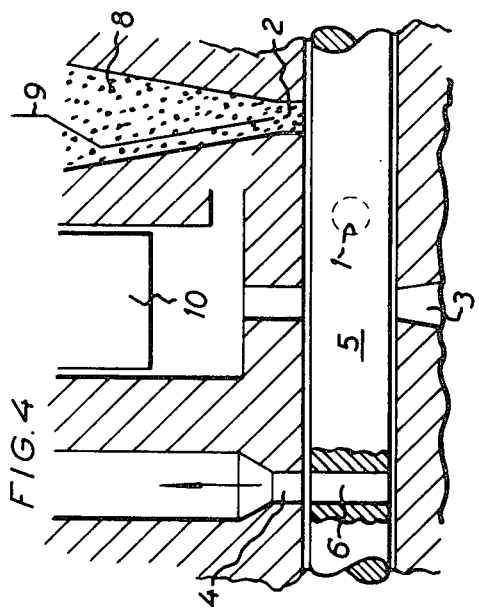
FIGS. 3–6 show the apparatus in four successive positions following the position shown in FIG. 1.
Figure 4:
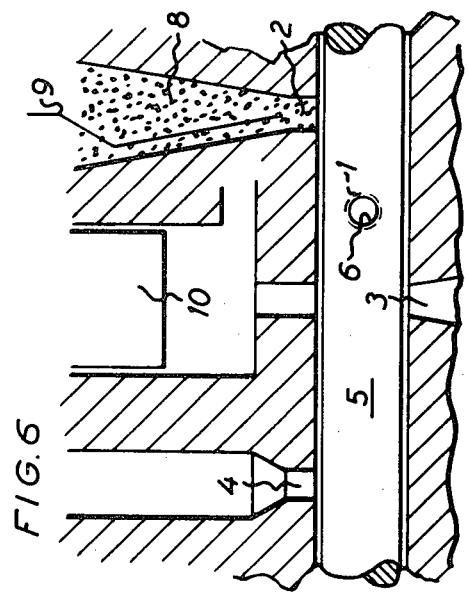
Figure 5:
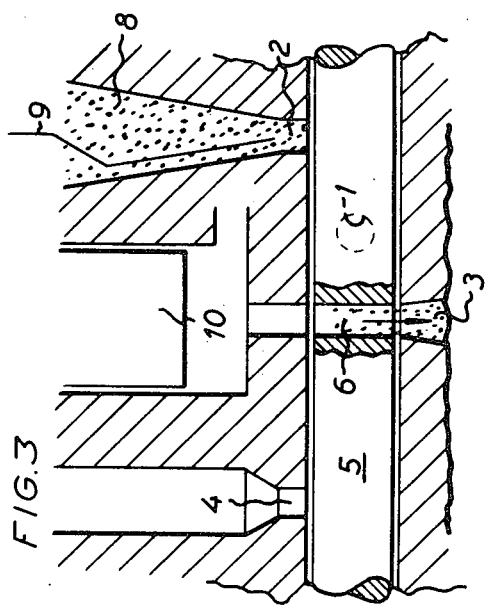
Figure 6:
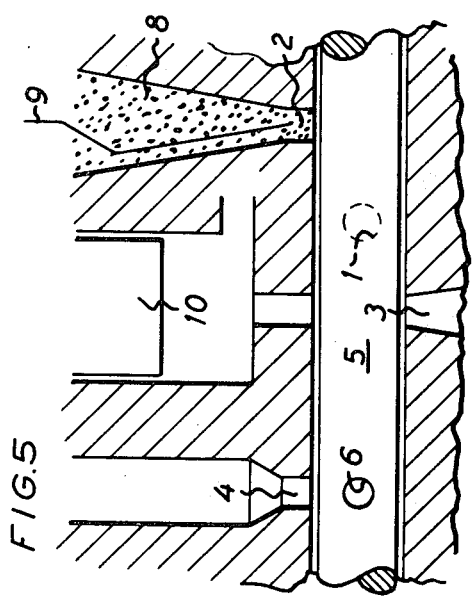

After the fuel powder has left the pre-chamber 6 in the position illustrated in FIG. 3, the slide 5 with the pre-chamber 6 is returned to the FIG. 4 position, which places the pre-chamber 6 in communication with the ambient air so that the pressure in the chamber 6 sinks to almost atmospheric pressure. The slide 5 is then rotated through an angle of 90°, as will appear from FIG. 5. After said rotation the slide 5 is shifted so that the pre-chamber 6 is placed in communication with the connection 1 leading to the vacuum source. According to FIG. 2, the vacuum source is a space 11 of controllable volume which is connected to a fixed large chamber 12, where the pressure can be varied from 0.001 bar to about 1 bar in order that a variable vacuum shall be obtained in the movable and rotatable pre-chamber 6 and thereby a variable degree of admission into the pre-chamber 6.

The pre-chamber 6 is then shifted again and rotated back through an angle of 90°, which will again place it in communication with the connection 2 leading to the conical fuel container 8 for the initiation of a new engine cycle.

The rotation of the slide is realized in order that the pre-chamber 6 shall not again be charged with hot gas from the engine when it is moved from the connection 4 to the connection 1. It should be mentioned in this context that the connection 3 is of such a length that the slide 5 is protected against overheating from the combustion chamber. The connection 3 should therefore be at least about 200 mm long.

The accelerating means 10 includes a control and damping piston which prevents natural oscillations in the means due to changes of volume thereof.

According to FIG. 2, the fixed large chamber 12 is a vacuum tank which is connected to a vacuum pump 14 via a conduit 13. The tank 12 is besides connected via conduit 15 to the chamber 11 which is a vacuum damping chamber of variable volume. This chamber 11 is in communication with the connection 1. The pressure in the vacuum tank 12 is controlled by means of the valve 16 through which air is supplied to the tank 12. In other words, the control valve 16 determines the fuel supply to the engine.

Figure 7:
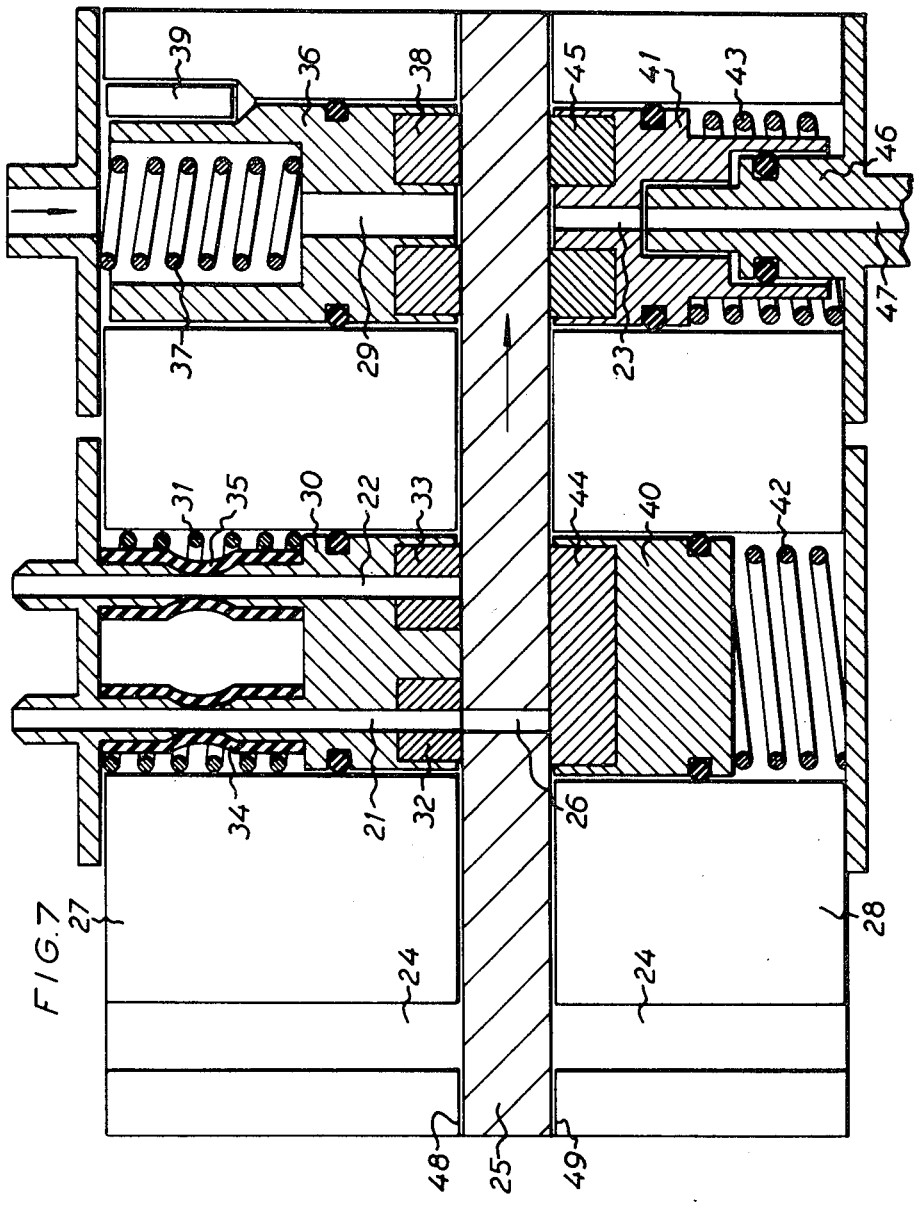
FIG. 7 is a longitudinal section of the apparatus in a second embodiment thereof.

The embodiment of the fuel injection apparatus illustrated in FIG. 7 operates substantially in the same way as the apparatus described above with reference to FIGS. 1–6. It is thus equipped with the fixed connection 21 leading to the vacuum source, the fixed connection 22 leading to the fuel supply, the fixed connection 23 leading to the combustion chamber and the fixed connection 24 leading to the ambient air. The movable member could be a slide, but actually is a rotary disk 25 having plane parallel upper and lower sides, said disk 25 being disposed between a stationary upper body 27 and a likewise stationary lower body 28. The connections 21 and 22 are arranged in the upper body 27 while the connection 23 is arranged in the lower body 28. An acceleration passage 29 is provided in the upper body 27 opposite the connection 23 in the lower body 28. The connection 24 leading to the ambient air is provided in both the upper body 27 and the lower body 28. The rotary disk 25 is formed with a through hole 26 which constitutes the pre-chamber for the fuel powder. Said pre-chamber 26 is adapted, during an engine cycle, to pass the connections 21–24 in the same sequence as the pre-chamber 6 passes the connections 1–4.

30 designates a sealing element for the connections 21 and 22. An O-ring is disposed between the sealing element and the upper body 27. The sealing element 30 is urged against the disk 25 by a spring 31. The sealing element 30 on the side turned towards the disk 25 has wear-resistant means 32 and 33 of sintered carbide, teflon, teflon reinforced with glass powder, bronze etc.

The fixed connections 21 and 22 are connected via flexible hoses 34 and 35 to tubular sockets which in turn are connected to the vacuum source and the fuel supply.

The sealing element for the acceleration passage 29 is designated 36 and, like the sealing element 30, equipped with an O-ring, a pressure spring 37 and wear-resistant means 38. The sealing element 36 besides co-operates with a guide pin 39 which prevents the element from rotating. 40 and 41 designate a pair of sealing elements which are arranged in the lower body 28 opposite the sealing elements 30 and 36. Both sealing elements 40 and 41 are equipped with O-rings, pressure springs 42 and 43, respectively, and wear-resistant means 44 and 45, respectively.

46 is a closure member which by way of an O-ring establishes a seal with respect to the sealing element 41. The closure member 46 is provided with a conduit 47 through which the fuel powder is supplied to the engine.

The gaps 48 and 49 between the rotary disk 25 and the upper and lower bodies 27 and 28, respectively, shall be small and less than 0.05 mm. The gaps shall be filled with oil.

The sealing elements described in the foregoing are of the utmost importance to the function of the fuel injection apparatus, since an effective seal must be established between the vacuum connection 21, the fuel connection 22 and the acceleration passage 29. Should the sealing element 36 for the acceleration gas not establish a reliable seal at the same time as the sealing element 33 seals against the fuel powder connection 22, the gas will flow into the fuel fill connection 22, thus interrupting the fuel supply and consequently stopping the engine. The above-described lubrication which is brought about by pyrolysis of the fuel powder, is of great importance in this connection.

In a modification of the embodiment illustrated in FIG. 7, all connections are provided on one side of the rotary disk 25. In this case no sealing element need be disposed on the side of the disk 25 devoid of connections. The pre-chamber must have its inlet and outlet disposed on the side of the rotary disk 25 facing the connections. For this reason the pre-chamber preferably is an arcuate channel in the disk 25.

Figure 8:
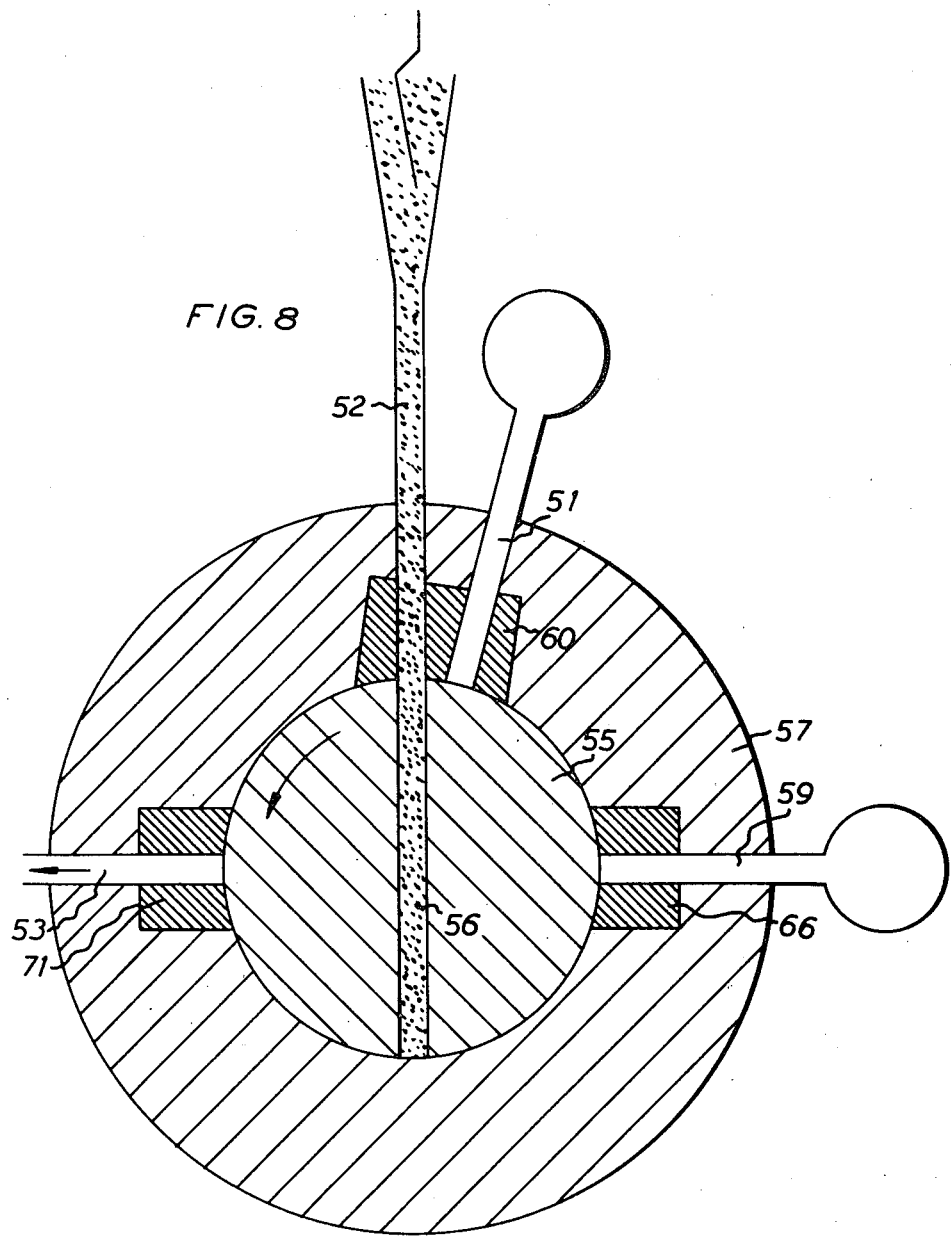
FIG. 8 is a diagrammatic longitudinal section of the apparatus in a third embodiment thereof.

The embodiment shown in FIG. 8 differs from that in FIG. 7 above all in that the movable member 55 having the pre-chamber 56 is a cylinder which is mounted for rotation in a stationary part 57. Said part 57 is provided with the fixed connection 51 to the vacuum source, the fixed connection 52 to the fuel supply and the fixed connection 53 to the combustion chamber. Diametrically opposite the last mentioned connection 53, the part 57 is formed with the acceleration passage 59. Of course, the part 57 can also have a fixed connection leading to the ambient air. The rotary cylinder 55 is provided with a channel 56 extending diametrically there-through and constituting the pre-chamber for the fuel powder.

In this embodiment, the fixed connections 51, 52 53 and 59 co-operate with sealing elements 60, 71 and 66 of substantially the same design as the sealing elements 30, 41 and 36. The sealing elements are only diagrammatically shown in FIG. 8.

It is of great importance also in this case that the gap between the movable member 55 and the stationary part 57 be very small and preferably less than 0.05 mm. The gap shall be filled with oil.

In the embodiments illustrated, the pre-chamber which is in the form of a channel has substantially the same cross-section as the connections with which it is adapted to co-operate. This highly contributes to a reliable function of the pre-chamber.

The movable member with its pre-chamber can be common to the combustion chambers of an engine.

The fixed connections need not neccessarily be stationary but can be arranged to move with respect to the movable member which in turn could be stationary.

The energy required to fill the pre-chamber with fuel powder is obtained from the expanding air molecules prevailing between the fuel powder grains in the conduit after the hopper. At an amount of 50% of air in the fuel powder there is obtained an acceleration of about 2000 m/s$^2$, when the pre-chamber has a length of 50 mm and a diameter of 10 mm. This implies that also high-speed Otto engines can advantageously be driven by means of pulverulent fuel provided that the powder is sufficiently finely ground.

The invention should not be considered as restricted to the embodiments described above and illustrated in the drawing, since it permits being modified within the spirit and scope of the appended claims.

What I claim and desire to secure by Letters Patent is:

1. An apparatus for injecting pulverulent fuel into the combustion chamber of an internal combustion engine comprising
    a fixed connection to the combustion chamber;
    a vacuum source having a fixed connection attached thereto;
    a fuel supply of fuel powder having a fixed connection attached thereto;
    means to apply pressure to said fuel supply having a fixed connection attached thereto;
    a fixed connection to ambient air;
    sealing means having means to apply said sealing means under pressure;
    and movable means cooperating with said sealing means and having a pre-chamber for fuel powder, to connect said pre-chamber during a cycle of the internal combustion engine successively to:
    said fixed connection to said vacuum source,
    said fixed connection to said fuel supply of fuel powder,
    said fixed connection to the combustion chamber and simultaneously with said means to apply pressure to said fuel supply,
    and said fixed connection to ambient air,
    while said means to apply said sealing means under pressure applies said sealing means sealingly against said movable means to seal said pre-chamber attachment with each of said fixed connections,
    whereby said pre-chamber successively has a vacuum therein from its said connection to said vacuum source, has fuel powder fed therein by the action of the vacuum prevailing therein, has fuel powder injected into said connection to the combustion chamber by the action of pressure placed on the fuel from said connection from said means to apply pressure to said fuel supply, and has lowered pressure by said connection to ambient air.

2. An apparatus as claimed in claim 1, wherein said movable means having said pre-chamber is a reciprocable and rotary slide, said pre-chamber being a through channel extending transversely of said slide.

3. An apparatus as claimed in claim 1, wherein said movable means having said pre-chamber is a rotary cylinder, said pre-chamber being a channel extending diametrically through said cylinder.

4. An apparatus as claimed in claim 1, wherein said movable means having said pre-chamber is a rotary disk.

5. An apparatus as claimed in claim 4, wherein said pre-chamber is a channel extending through said rotary disk.

6. An apparatus as claimed in claim 4, wherein said pre-chamber is a channel extending in an arc and having its inlet and outlet situated on the same side of said rotary disk.

7. An apparatus as claimed in claim 1, wherein said pre-chamber being in the form of a channel is of substantially the same cross-section as said connections with which it is arranged to co-operate.

8. An apparatus as claimed in claim 1, wherein the vacuum of said vacuum source in infinitely adjustable for infinite regulation of the supply of fuel powder to said pre-chamber and thus to the combustion chamber.

9. An apparatus as claimed in claim 8, wherein said vacuum source is a relatively large vacuum tank with a vacuum pump connected thereto, said tank being provided with a control valve connected to the ambient air in order to bring about the infinite adjustment of the vacuum.

10. An apparatus as claimed in claim 1, which is common to a number of combustion chambers in the engine, said movable member being provided with a number of pre-chambers corresponding to the number of combustion chambers.

* * * * *